United States Patent [19]

Bussiere et al.

[11] Patent Number: 4,465,698

[45] Date of Patent: Aug. 14, 1984

[54] SYRUP FOR CANDYING, MEANS FOR ITS PREPARATION, ITS USE AND PRODUCTS SO-OBTAINED

[75] Inventors: Guy Bussiere, La Gorgue; Michel Huchette, Merville, both of France

[73] Assignee: Roquette Freres, France

[21] Appl. No.: 374,142

[22] Filed: May 3, 1982

[30] Foreign Application Priority Data

May 4, 1981 [FR] France ................... 81 08764

[51] Int. Cl.³ ............. A23G 3/00; A24L 1/212; A23L 1/09
[52] U.S. Cl. ...................... 426/102; 426/103; 426/658; 426/66 D; 426/639; 127/38; 127/40
[58] Field of Search ............ 426/658, 639, 102, 103, 426/66 D; 435/94, 95, 98; 127/38, 40

[56] References Cited

U.S. PATENT DOCUMENTS 3,984,580 10/1976 Gur-Arieh ................. 426/658
4,041,184 8/1977 Bonacina ................... 426/658
4,217,413 8/1980 Walon ...................... 426/658
4,279,931 7/1981 Verwaerde et al. .......... 426/658
4,281,028 7/1981 Walon ...................... 426/658
4,346,116 8/1982 Verwaerde et al. .......... 426/658

FOREIGN PATENT DOCUMENTS 1177701 1/1970 United Kingdom ............ 426/658
197901 1/1979 United Kingdom ............ 426/658

Primary Examiner—Jeanette M. Hunter
Attorney, Agent, or Firm—Larson and Taylor

[57] ABSTRACT

Syrup for candying having the following composition:

| | |
|---|---|
| total fructose content | < 17.5% |
| dextrose content | < 35% |
| maltose content | < 25% |
| content of polysaccharides of DP > 20 | < 2%, | the complement of 100% being constituted by saccharides of degree of polymerization ranging from 3 to 20.

8 Claims, No Drawings

SYRUP FOR CANDYING, MEANS FOR ITS PREPARATION, ITS USE AND PRODUCTS SO-OBTAINED

The invention relates to a syrup for candying for food substances; it relates also to the process and the means adapted to enable the preparation of this syrup as well as the candying process utilizing this syrup and the candied products thus produced.

Candying may be defined as the operation consisting of substitution of the cellular and intercellular liquids of vegetable tissues constituting, for example, the edible portion of fruits, citrus fruit peel and the stems of certain plants, by a sugar syrup, so that the candied product so-obtained is a sweet confectionery or candied fruit, containing a proportion of sugars which is so important that the said product is not subject to the usual biological deteriorations, such as fermentation or development of mold.

The list of biological products which can undergo such candying is extremely long but, by way of example, may be mentioned whole or portions of fruits such as cherries, peaches, plums, melons, pumpkins or watermelons and fruit peel such as that of citrus fruit.

Between the time of harvesting the raw materials and that of their use in candying, a longer or shorter time elapses which necessitates calling upon preserving techniques. The products intended for candying are subjected to a treatment usually called "pickling" in accordance to which protective substances such as sodium bisulfite or various other salts are applied. There is no need to dwell on this preliminary phase which is not directly related to the invention.

The candying of the various vegetable parts, which will be classified under the term "fruits" in the description below, consists of carrying out an exchange through the peripheral zone of the fruit and also of the inner cell walls, which exchange is characterised both by an egress of the constituent water of the fruit, and by diffusion of the inside of the fruit of the constituent sugars of the outside syrup for candying.

At the start, the fruits are generally constituted by, in decreasing order by weight,
 water (mostly over 90%),
 sugars, present in variable amount but in any case less than 10% (and even close to 0% for pickled fruits),
 cell walls.

These fruits whose concentration of sugars is very low since it is less than 10%, are immersed in a syrup whose concentration of sugars is over 10%. Under these conditions, the physical laws of osmosis and diffusion operate in the sense of equalization of the concentrations of sugars between the inside and the outside of the fruit, which is manifested as previously indicated, by penetration of the sugars to the inside of the fruit and by a migration of water outwards.

When this equilibrium is reached, the fruits are plunged into a second syrup, of higher concentration than that of the first, and so on, so that in successive stages, the concentration of sugars inside the fruit is increased to the desired value, which is generally situated well above 60% and which is mostly comprised between 70 and 80%, so as to limit the risk of biological deteriorations.

Industrial candying processes permitting this gradual and regular increase of concentration of sugars inside the fruit, belong, in principle, to two categories.

The first category comprises old batchwise processes in which the fruit is immersed successively into syrups of higher and higher concentrations. This process has a tendency to be replaced more and more by the processes of the second category which are continuous and in which the progressive increase in the concentration of the syrup is mostly effected by evaporation. Numerous adaptations and special arrangements exist however for the processes of each of the two categories.

The syrups applied in these candying processes must simultaneously satisfy conditions of viscosity, absence of crystallization and efficiency or yield of candying.

The viscosity conditions constitute an important criterion, particularly in the case of the highly concentrated syrup used in the last phase of the candying; too high a viscosity conflicts with good draining of the fruit, once the candying process proper is finished; such too high a viscosity therefore results in the fruit remaining sticky and tacky.

Crystallization must be avoided at any price in the finished fruit; in fact, this change in texture would render the finished product unmarketable.

The yield of the candying must be of course as high as possible, it being understood that, by candying yield, is meant the weight ratio between the candied, finished fruit and the starting fruit prepared for candying.

To satisfy all of these three conditions, syrups for candying are traditionally constituted by a mixture of equal parts (with respect to the dry matter) of saccharose (or sucrose) and a glucose syrup, of high DE (dextrose-equivalent), generally close to 60, usually obtained by hydrolysis of starch by the mixed acid-enzyme process. This syrup generally corresponds to a composition close to the following composition:

| | |
|---|---|
| glucose | 29 |
| maltose | 36 |
| products of DP (degree of polymerization) 3 | 10 |
| products of DP 4 to 10 | 14 |
| products of DP 10 to 20 | 7 |
| products of DP > 20 | 4. |

The presence of the glucose syrup is technically beneficial by reason of the fact that it is very difficult to manufacture candied fruit not showing a recrystallization phenomenon from a syrup for candying which only contains saccharose; saccharose crystallizes, at ordinary or ambient temperatures, when the concentration reaches 67%, hence at a concentration distinctly below that of 75 to 80% selected in practice for candied fruit.

In addition, there occurs, under the conditions of acidity and temperature of candying, an inversion of the saccharose, that is to say hydrolysis of the latter into fructose and into dextrose. For reasons connected with the acidity of the fruit itself and to attain better candying yield, the said candying is carried out at fairly low pH's, generally situated around 4. In addition, the optimum temperature of candying is close to 60° C. and, lastly, certain syrups, diluted by water derived from the fruit, must be concentrated by evaporation at high temperature. These conditions of acidity and high temperature concur to facilitate inversion of the saccharose and lead to invert sugar formation, a mixture of fructose and of glucose. Now, glucose is particularly weakly soluble (44% at 20° C.); consequently, by using a pure saccharose syrup, the risks of recrystallization are very great whatever the level of inversion reached.

This explains that the composition defined above comprising 50% of saccharose constituted, for many years, an optimum for candying.

It is pointed out however that it has been proposed to replace part of the saccharose, especially the fraction which undergoes inversion in the course of candying process, directly by invert sugar or by isoglucose (by this expression is meant syrups with high fructose content called High Fructose Corn Syrup, of composition very similar to that of invert sugar and which are obtained from starch, by hydrolysis followed by isomerization).

A typical composition of such syrups for candying with isoglucose content is given below, the percentages being given with respect to the dry matter:

| | |
|---|---|
| saccharose | 25% |
| invert sugar or isoglucose | 25% |
| glucose syrup of about 60 DE | 50%. |

The lowering of the saccharose content of syrups for candying to 50% of the total weight by means of the use of the glucose syrup defined above, no longer constitutes an optimal solution although it has generally given satisfaction in the past.

The reason is that saccharose has the major drawback of being a product whose price, connected with various economic factors, is rather fluctuating and of which the supply is uncertain. Furthermore, saccharose necessitates previous dissolving which complicates the process.

Moreover, the high sweetening power of saccharose may, in certain cases, be considered as prejudicial from the organoleptic point of view.

Syrups for candying, less and less rich in saccharose have therefore been proposed.

However, until now, it has not been possible to lower this content to a value below about 35%.

It is therefore a particular object of the invention, to overcome these difficulties and to provide a syrup for candying with a saccharose content less than 35%, as well as the means adapted to enable the preparation of this syrup.

Applicants have had the merit of discovering, after long research, that a syrup perfectly suited to candy or manufacture and with a saccharose content below 35% or with a "total fructose" content (this expression embracing both free fructose derived from invert saccharose or from isoglucose and the constituent fructose of the saccharose present) less than 17.5%, should have:

a dextrose content <35%
a maltose content >25%
a content of polysaccharides of DP higher than 20<2%, the complement to 100 being constituted by saccharides of degree of polymerization from 3 to 20.

Consequently, the syrup for candying according to the invention is characterised by the following composition:

| | |
|---|---|
| 0 ≦ total fructose content | < 17.5% |
| 1 < dextrose content | < 35% |
| 25 < maltose content | < 75% |
| 0 ≦ content of products of DP > 20 | < 2%, | the complement to 100 being constituted by saccharides of DP ranging from 3 to 20.

According to an advantageous embodiment, the above-said syrup for candying has the following contents of dextrose and of maltose

| | | |
|---|---|---|
| 1 | <dextrose content | <33% |
| 27 | <maltose content | <70% | and, more preferably still, the syrup for candying has the following contents of dextrose and of maltose

| | | |
|---|---|---|
| 1 | < dextrose content | < 33% |
| 27 | < maltose content | < 65%. |

Applicants have also had the merit of defining means particularly adapted to the preparation of syrups for candying according to the invention, these means being constituted by glucose syrups, of a particular composition and whose use in this preparation is a part of the invention.

Consequently, the means, that is to say the glucose syrups according to the invention, for the preparation of syrups for candying, are characterised by the fact that:

the sum of the contents of dextrose and maltose is higher than 55% and, preferably, less than 85%, the content of maltose is higher than 38% and can reach 75%, the content of polysaccharides of degree of polymerization >20 is less than 4% and may be equal to zero.

The manufacturing process according to the invention of syrups for candying is characterised by the fact that:

either suitable amounts of glucose syrup used in accordance with the invention, on the one hand, and of saccharose and/or of isoglucose and/or of invert sugar, on the other hand, are mixed, or suitable amounts of glucose syrup used in accordance with the invention on the one hand, of saccharose and/or of isoglucose and/or of invert sugar on the other hand, and lastly of dextrose, are mixed, this in the eventuality that the glucose syrup which has to be utilized for preparing the desired syrup for candying must have a dextrose content higher than that which this glucose syrup can have on emerging from the preparatory hydrolysis step.

The candied products according to the invention are characterised by the fact that they are prepared by the utilization of the syrup for candying according to the invention.

The invention relates also to other features which are preferably used at the same time and which will be more explicitly considered below.

It will in any case, be well understood by means of the additional description which follows and of the examples, said description and examples being given with respect to advantageous embodiments, but which are in no event to be considered as limiting.

In order, consequently, to constitute syrups for candying according to the invention, procedure is as follows or in equivalent manner, particularly by resorting to the glucose syrups which constitute the means according to the invention for the preparation of these syrups for candying.

The abovesaid glucose syrups, whose use is contemplated for the constitution of the syrups for candying and which have the following composition:

sum of the contents of dextrose and maltose higher than 55% and, preferably, less than 85%, content of maltose higher than 38% and possibly reaching 75%, content of polysaccharides of degree of polymerization higher than 20 less than 4% and which can be nil, are mixed in suitable amounts with amounts of saccharose and/or of isoglucose and/or of invert sugar selected to result in a syrup for candying of the desired composition, if necessary after having been mixed with suitable amounts of dextrose or of glucose syrups with high glucose content to arrive at glucose syrups having dextrose contents such as is impossible to obtain directly by hydrolysis.

In this way, syrups for candying according to the invention are obtained which correspond to the following composition:

| | | |
|---|---|---|
| 0 ≦ | total fructose content | < 17.5% |
| 1 < | dextrose content | < 35% |
| 25 < | maltose content | < 75% |
| 0 ≦ | content of products of DP > 20 | < 2%, | the complement to 100 being constituted by saccharides of DP ranging from 3 to 20, this composition being such that, in an advantageous embodiment, it satisfies the two following relationships:

| | | |
|---|---|---|
| 1 < | dextrose content | < 33% |
| 27 < | maltose content | < 70%. |

In another advantageous embodiment, the composition of the syrups for candying according to the invention corresponds to the following contents:

| | | |
|---|---|---|
| 1 | <dextrose content | <33% |
| 27 | <maltose content | <70% |
| 0 | ≦total fructose content | <15% |
| 0 | ≦content of polysaccharides of DP > 20 | <1.5%, | the complement to 100 being constituted by saccharides of degree of polymerization comprised between 3 and 20.

It is thus possible, in accordance with the invention, to carry out, for example, the candying of fruit with a syrup only containing 30% of saccharose and/or of invert sugar and/or of isoglucose, whilst having sound draining, good yield and good candying speed and whilst resulting in excellent appearance of the candied fruit, which do not show any recrystallization, by the use of a syrup for candying containing approximately, for example, 30% of glucose, 30% of maltose, less than 1% of polysaccharides of degree of polymerization (DP) higher than 20, the remainder being constituted by oligo- and polysaccharides of DP comprised between 3 and 20.

As a general rule, the lower the percentage of saccharose and/or of invert sugar and/or of isoglucose (expressed by the total fructose percentage) in the syrup for candying, the higher must be the percentage of maltose; the maltose percentage thus raises from about 25% for a total fructose level of 17.5% to a percentage higher than 40%, preferably higher than 42%, when the total fructose level becomes less than 5%.

Correlatively, the level of polysaccharides of degree of polymerization higher than 20, diminishes and must be less than about 1.5% for a total fructose level less than 15; it must be less than 0.5% when the total fructose level becomes less than 5%.

From a more general point of view, the average degree of polymerization of the oligosaccharides and polysaccharides introduced by the glucose syrup must be lower and lower progressively as the percentage of glucose syrup in the syrup for candying is increased, this in order to ensure correct viscosity at the end of candying, enabling good draining, as well as good kinetics and good candying yield.

The Brookfield viscosity of the syrups for candying according to the invention is less than 16 000 cps, preferably above 6 000 cps and, more preferably still, comprised between 7 000 and 13 000 cps. This viscosity is measured at a concentration of dry matter of 78% and at 15° C., on a Brookfield, model R.V.T., viscosimeter, with the No. 5 spindle and for a speed of 20 rpm; taking into consideration, however, the fact that the inversion ratio of the saccharose possibly present in the syrup for candying notably influences the viscosity of the latter, it is pointed out that the viscosity values given above correspond to an inversion ratio of the saccharose in the vicinity of 50%.

The glucose syrups used according to the invention for the preparation, by mixing with saccharose and/or invert sugar and/or isoglucose, of syrups for candying according to the invention, may be manufactured, in manner known in itself, by hydrolysis of starch, either by the acid-enzymatic route, or by the purely enzymatic route, the saccharification being necessarily carried out in the presence of a β-amylase, in order to obtain the desired maltose percentage. Further to the addition of dextrose, it is possible to mix different glucose syrups to lead to the desired composition of dextrose, of maltose and of oligo- and polysaccharides.

The syrups for candying according to the invention, as well as the candying process applying these syrups, have numerous advantages.

These syrups have a viscosity compatible with good draining and enable good yields to be obtained, comparable and even better than those obtained with the syrups according to the prior art. By reason of the reduction in content of saccharose and/or of invert sugar or of isoglucose, the candied fruits have a less sugary flavor, which has been favourably estimated, in taste tests, by a majority of tasters. Lastly, the candied fruits obtained are well swollen, do not have surface wrinkles and do not recrystallize in the course of storage.

The invention will be better understood by means of the following Example.

EXAMPLE

Various tests of candying bigarreaux cherries were carried out, on the one hand, with two traditional syrups for candying with 50% saccharose (no. 3 and no. 4) and, on the other hand, with two syrups for candying according to the invention (no 1 and no 2), the first comprising 30% of saccharose and the other not containing any.

The candying process used is described below.

The fruits to be candied were pitted bigarreaux cherries of caliber 20–22 candied in brine.

Before candying, fruits were scalded in a first bath of boiling water for 45 minutes, and then re-immersed in a second bath of boiling water again for 45 minutes. They were then drained on a metal gauze of 5 mm mesh aperture for 3 minutes.

Into a 2 liters beaker, were then successively introduced 1800 g of syrup for candying, brought previously to a concentration of 32 Brix, and 300 g of scalded and drained bigarreaux cherries. The amount of syrup (1800 g) is sufficient to cover the cherries during the whole candying operation. There was then added gradually citric acid, in 50% solution, in order that the pH of the mixture should be equal to about 3.9.

Three samples of each syrup for candying distributed in three beakers were tested, in order to permit an average of the results to be established.

Then the 12 beakers were placed in a thermostated vessel of the "H.L.O. 250 L" type, marketed by the firm Ets FLAM & Cie, this vessel being adjusted so as to obtain by evaporation a regular development of the Brix during the whole candying operation.

The duration of the candying being nine days, the conditions of temperature and relative humidity as well as the changes in the Brix of the syrup are collected in Table I below.

TABLE I

| Progress of candying (in days) | Relative humidity | Temperature (°C.) | Brix of the syrup |
|---|---|---|---|
| at the start | 45–50 | 60 | 32 |
| end of 1st day | 45–50 | 60 | 35 |
| end of 2nd day | 45–50 | 60 | 47 |
| end of 3rd day | 45–50 | 60 | 54 |
| end of 4th day | 45–50 | 60 | 62 |
| end of 5th day | | 60 | 67 |
| end of 6th day | | 60 | 70 |
| end of 7th day | stop of regulation | 60 | 72.5 |
| end of 8th day | | 60 | 74 |
| end of 9th day | | 60 | 75 (end of candying) |

The thus candied bigarreaux cherries were then arranged on a metal gauze of 500 cm² having a mesh size of 5 mm and they were left to stand thus for 24 hours at room temperature (about 20° C.).

The candying yield can then be calculated according to the formula:

$$R = \frac{\text{Weight of candied fruit}}{\text{Weight of scalded and drained fruit}} \times 100$$

The syrup no 1 which contains 30% of saccharose, was prepared by mixing 30% of saccharose and 70% of a glucose syrup $G_1$ whose composition is indicated in Table II below.

The syrup no 2, which does not contain saccharose, is constituted only by syrup $G_2$ whose composition is also indicated in Table II.

The traditional syrup no 3 was prepared by mixing 50% of saccharose and 50% of a glucose syrup $G_3$ whose composition is indicated in Table II.

The traditional syrup no 4 was prepared by mixing 50% of saccharose and 50% of a glucose syrup $G_4$ whose composition is also indicated in Table II.

TABLE II

| | Amount (in %) for each of the syrups $G_1$ to $G_4$ | | | |
|---|---|---|---|---|
| Constituent | $G_1$ | $G_2$ | $G_3$ | $G_4$ |
| Dextrose | 21 | 30 | 29 | 5 |
| Maltose | 44 | 51.5 | 36 | 47 |
| Product of DP 3 | 14 | 15 | 10 | 20 |
| Oligosaccharides of DP 4 to DP 10 | 10 | 3.5 | 14 | 12 |
| Polysaccharides of DP 10 to DP 20 | 10 | 0 | 7 | 10 |
| Polysaccharides of DP > 20 | 1 | 0 | 4 | 3 |

The final composition and the viscosity of the syrups for candying as well as the results obtained are collected in Table III.

TABLE III

Final composition (on dry matter) of syrups for candying and results obtained

| PROPERTIES OF SYRUP FOR CANDYING | | SYRUP N°1 30% of saccharose 70% of syrup $G_1$ | SYRUP N°2 100% of syrup $G_2$ | SYRUP N°3 50% of saccharose 50% of syrup $G_3$ | SYRUP N°4 50% of saccharose 50% of syrup $G_4$ |
|---|---|---|---|---|---|
| Composition in | DP 1 | 22.2 D + 7.5 F | 30 D | 27.0 D + 12.5 F | 15 D 12.5 F |
| | DP 2 | 30.8 M + 15 S | 51.5 M | 18 M + 25 S | 23.5 M + 25 S |
| | DP 3 | 9.8 | 15 | 5 | 10 |
| | DP 4 to DP 10 | 7 | 3.5 | 7 | 6 |
| | DP 10 to DP 20 | 7 | 0 | 3.5 | 5 |
| | DP >20 | 0.7 | 0 | 2 | 3 |
| Total potential fructose content (free fructose + ½ S) | | 15 | 0 | 25 | 25 |
| Brookfield viscosity of the syrups with 78% dry matter and at 15° C. (cps) | | 10 750 | 8 500 | 10 500 | 12 500 |
| Final Brix of the candied fruit | | 74.5 | 75.0 | 74.5 | 74.5 |
| Final Brix of the syrup | | 76.0 | 76.2 | 76.2 | 76.0 |
| Brookfield viscosity of the syrups after draining at 21° C. (cps) | | 12 500 | 10 500 | 12 000 | 14 500 |
| Yield (%) | | 145.5 | 146.5 | 143.7 | 143 |
| Appearance candied fruits | | swollen no wrinkling | swollen no wrinkling | swollen no wrinkling | swollen no wrinkling slightly tacky |

The compositions of syrups N°1, N°3 and N°4 were calculated by starting from the hypothesis that inversion of the saccharose affects 50% of the latter.

Meaning of the abreviations:
D = dextrose
M = maltose
F = free fructose
S = saccharose.

The results show that it is possible, by using syrups for candying according to the invention, to obtain satisfactory yields even superior to those obtained with control syrups for candying, whilst having saccharose and/or invert sugar or isoglucose (expressed by the proportion of total potential fructose) percentages less than 35%, and these percentages can even be nil.

Thus, a yield of 145.5% is obtained with syrup no 1 including only 30% of saccharose, and the yield of 146.5% is obtained with the syrup no 2 containing only glucose syrup.

The candied fruits obtained show, on the other hand, an appearance equivalent to those obtained by candying with traditional syrups. They are well swollen, do not show wrinkles at the surface and do not recrystallize.

A comparative taste test has shown, in addition, that the candied fruits obtained with the syrups for candying according to the invention were at least as well liked as those prepared with traditional syrups. In particular, the candied fruits produced with syrup no 2 were particularly well noted by reason of their less pronounced sweet taste.

As is self-evident and as emerges already from the foregoing, the invention is in no way limited to the embodiment which has just been described; it encompasses, on the contrary, all modifications.

We claim:

1. Syrup for candying having the following composition:

| | |
|---|---|
| $0 \leq$ total fructose content | $< 17.5\%$ |
| $1 <$ dextrose content | $< 35\%$ |
| $25 <$ maltose content | $< 75\%$ |
| $0 \leq$ content of products of DP $> 20$ | $< 2\%$, | the complement to 100% being constituted by saccharides of DP ranging from 3 to 20.

2. Syrup according to claim 1, having the following contents of dextrose and maltose:

| | |
|---|---|
| $1 <$ dextrose content | $< 33\%$ |
| $27 <$ maltose content | $< 70\%$. |

3. Syrup according to claim 1, having the following contents of dextrose and of maltose:

| | |
|---|---|
| $1 <$ dextrose content | $< 33\%$ |
| $27 <$ maltose content | $< 65\%$. |

4. Process for the preparation of the syrup for candying according to anyone of claims 1 to 3, said process comprising mixing suitable amounts of a glucose syrup in which:

55% < the sum of the contents of dextrose and maltose $\leq$ 85% 38% < the content of maltose $\leq$ 75%

0 $\leq$ the content of polysaccharides of DP higher than 20 < 4% with at least one sugar selected from the group consisting of saccharose, isoglucose and invert sugar.

5. Process for the preparation of the syrup for candying according to claim 1, comprising mixing suitable amounts of a glucose syrup in which:

55% < the sum of the contents of dextrose and maltose $\leq$ 85% 38% < the content of maltose $\leq$ 75%

0 $\leq$ the content of polysaccharides of DP higher than 20 < 4% with dextrose and with at least one sugar selected from the group consisting of saccharose, isoglucose and invert sugar.

6. Process for candying food substances comprising the step of immersing the food substances to be candied in the syrup according to one of claims 1 to 3.

7. Process for candying fruits selected from the group consisting of cherries, peaches, plums, melons, pumpkins or watermelons as well as citrus fruit peels comprising the step of immersing the fruits to be candied in a syrup according to one of claims 1 to 3.

8. Candied fruits prepared by the process of claim 6.

* * * * *